United States Patent
Thandra et al.

(10) Patent No.: US 12,045,253 B2
(45) Date of Patent: Jul. 23, 2024

(54) TECHNIQUES FOR AUTOMATICALLY IDENTIFYING AND FIXING ONE WAY CORRECTNESS ISSUES BETWEEN TWO LARGE COMPUTING SYSTEMS

(71) Applicant: Microsoft Technology Licensing, LLC, Redmond, WA (US)

(72) Inventors: Shravya Thandra, North Bend, WA (US); Ana Monica Irimia, Adliswil (CH); John Ronald Berkeley, Kenmore, WA (US); Fangfang Zhang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 17/837,571

(22) Filed: Jun. 10, 2022

(65) Prior Publication Data

US 2023/0401228 A1 Dec. 14, 2023

(51) Int. Cl.
*G06F 16/27* (2019.01)
*G06F 16/2455* (2019.01)

(52) U.S. Cl.
CPC ........ *G06F 16/27* (2019.01); *G06F 16/24568* (2019.01)

(58) Field of Classification Search
CPC ............................ G06F 16/2456; G06F 16/27
USPC .......................................................... 707/634
See application file for complete search history.

(56) References Cited

U.S. PATENT DOCUMENTS

| | | | | |
|---|---|---|---|---|
| 10,417,190 | B1* | 9/2019 | Donlan | ................. G06F 16/128 |
| 2012/0254130 | A1* | 10/2012 | Mitra | .................. G06F 16/1873 |
| | | | | 707/E17.007 |
| 2016/0350358 | A1* | 12/2016 | Patel | .................. G06F 16/1748 |

* cited by examiner

*Primary Examiner* — Robert W Beausoliel, Jr.
*Assistant Examiner* — Lauren Zannah Ganger
(74) *Attorney, Agent, or Firm* — Novo TechIP International PLLC

(57) ABSTRACT

A data processing system implements identifying one-way correctness issues in datasets of large computing systems including a first computing system and a second computing system. The second computing system is associated with a dependent dataset that includes references to data in a second datastore associated with the first computing system. These references updated in response to changes to the data referred to by these references. However, errors can cause the two datasets to become out of sync. The system herein implements automatically identifying unattached items in a dependent dataset that references items in a reference dataset that is no longer present in the reference dataset by comparing the dependent dataset with the reference dataset, and automatically causing the second computing system to delete the unattached items from the dependent dataset.

20 Claims, 7 Drawing Sheets

TECHNIQUES FOR AUTOMATICALLY IDENTIFYING AND FIXING ONE WAY CORRECTNESS ISSUES BETWEEN TWO LARGE COMPUTING SYSTEMS

BACKGROUND

Large computing systems, such as but not limited to enterprise servers, cloud-based computing environments, are often associated with large datastores of data, electronic documents, and/or other content associated with the services provided by the large computing system. Often such computing systems reference data in another such computing system to provide services to user of the computing system. For example, a first computing system includes data that is referenced by data of a second computing system and used by the second computing system to provide various services to the users of the second computing system. However, synchronization errors may cause the references of the second computing system to no longer reflect the reality of the data in the first computing system. This is referred to herein as a "one-way correctness issue" because the data in the second computing system referencing the data of the first computing system is out of sync with the data in the first computing system.

Applications or services of the second computing system which rely on the data of the first computing system may experience errors that negatively impact the user experience when the user attempts to access data referenced on the first computing system that isn't actually available. Tracking down references in the data of the second computing system that are out of sync with the data of the first computing system is extremely challenging. Both the first and second computing systems may maintain vast amounts of data and detecting when the data between the two systems becomes out of sync can be especially challenging. A synchronization problem may not be discovered until an application or service on the second computing system attempts to access data referenced by the second computing system but is no longer referenced by the first computing system. For example, an application or service on the second computing system may attempt to access a file on the first computing system that was referenced in the data of the second computing system. However, the file has been deleted from the first computing system, but the deletion of this file was not propagated to the dataset maintained by the second computing system. Thus, the reference to this file in the dataset maintained by the second computing system is out of date. By the time the problem is discovered, a significant amount of time may have passed since the error occurred that cause the data of the first computing system to become out of sync with that of the second data system, thereby making it difficult or impossible to diagnose the problem. Hence, there is a need for improved systems and methods that provide a technical solution for proactively identifying one-way correctness issues between large computing systems and for identifying the root cause of these issues.

SUMMARY

An example data processing system according to the disclosure may include a processor and a machine-readable medium storing executable instructions. The instructions when executed cause the processor to perform operations including automatically identifying unattached items in a dependent dataset that references items in a reference dataset by comparing the dependent dataset with the reference dataset, the unattached items referencing data that is no longer present in the reference dataset, the reference dataset being associated with a first computing system and the dependent dataset being associated with a second computing system, and automatically causing the first computing system to delete the unattached items from the dependent dataset.

An example method implemented in a data processing system for identifying one-way correctness issues in datasets of large computing systems includes automatically identifying unattached items in a dependent dataset that references items in a reference dataset by comparing the dependent dataset with the reference dataset, the unattached items referencing data that is no longer present in the reference dataset, the reference dataset being associated with a first computing system and the dependent dataset being associated with a second computing system, and automatically causing the first computing system to delete the unattached items from the dependent dataset.

An example machine-readable medium on which are stored instructions according to the disclosure includes instructions, which when executed, cause a processor of a programmable device to perform operations of automatically identifying unattached items in a dependent dataset that references items in a reference dataset by comparing the dependent dataset with the reference dataset, the unattached items referencing data that is no longer present in the reference dataset, the reference dataset being associated with a first computing system and the dependent dataset being associated with a second computing system, and automatically causing the first computing system to delete the unattached items from the dependent dataset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
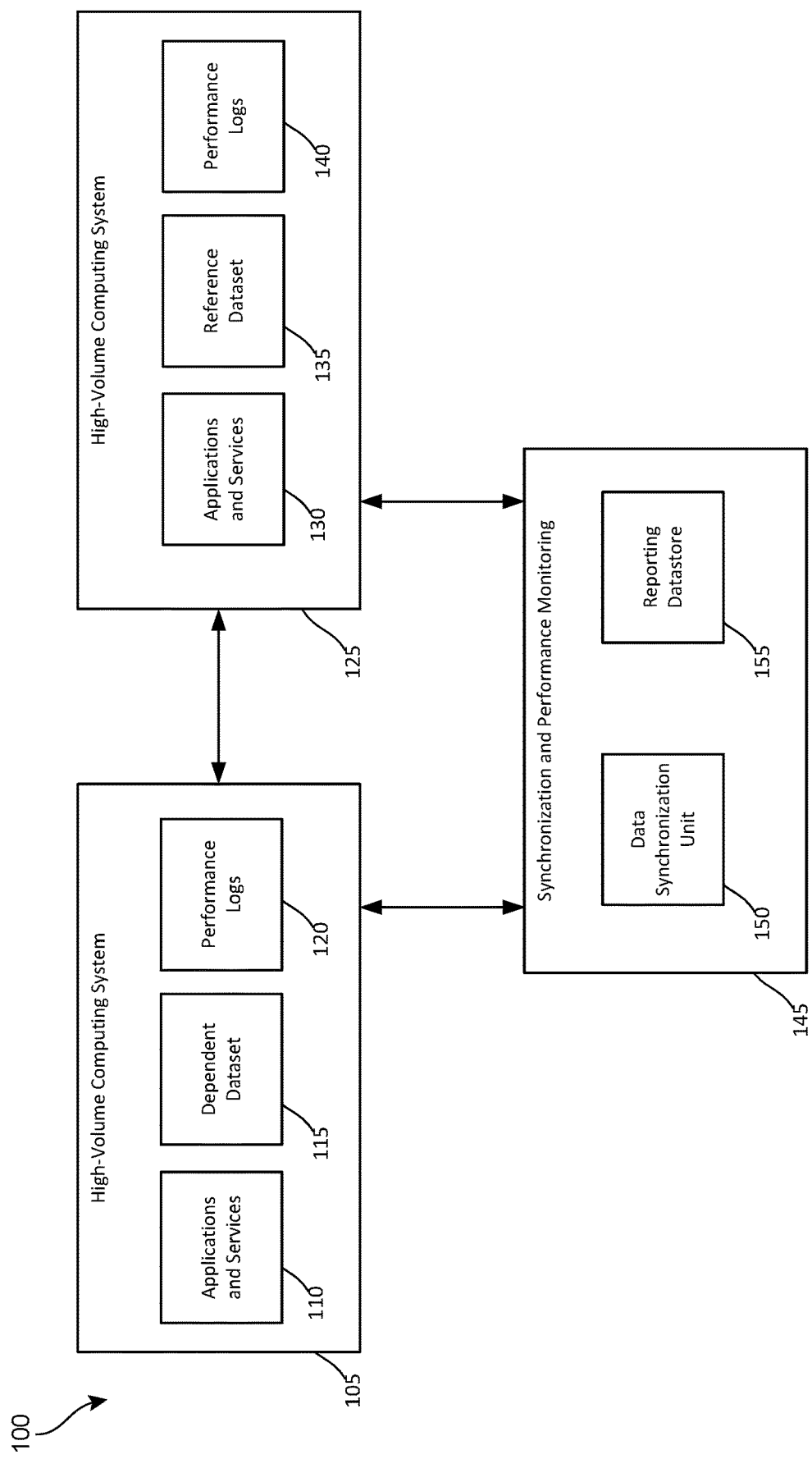
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for proactively identifying one-way correctness issues between large computing systems and for identifying the root cause of these issues are described herein. The techniques provided automatically compare dependent data of a second computing system referencing reference data of a first computing system with the reference data to proactively identify one-way correctness issues in the data of the second computing system. These techniques utilize services that are configured to periodically compare the dependent data of the second computing system referencing reference data of the first computing system with the reference data to identify references to unattached items and missing items. Unattached items, as used herein, refers to data, files, electronic documents, and/or other content that is referenced in dependent data of the second computing system as being available on the first computing system but are not actually available. The unattached items were available on the first computing system at the time that the data on the second computing system referencing these items was created. However, the unattached items may have been removed, renamed, or moved to a different storage location since the dependent data on the second computing system referencing these items was created and the references to these items in the data on the second computing system have not been updated. Missing items, as used herein, refers to data, files, electronic documents, and/or other content that is included in the reference data of the first computing system but is not referenced in the dependent data of the second computing system. The techniques provided detect unattached items and update the data of the second computing system to remove references to the unattached items. These techniques can also detect missing items and update the dependent data of the second computing system to include references to the missing items. A technical benefit of this approach is that one-way correctness issues in the dependent data of the second computing system are automatically detected. In the past, such synchronization errors would not become evident until an error in an application or service of the second computing system resulted from the application or service attempting to access an unattached item. Furthermore, detecting missing items may have been nearly impossible as the missing items would have been effectively invisible to the second computing system.

The techniques herein also provide means for collecting data that may be used to identify the root cause of such one-way correctness issues between large computing systems. These techniques can capture performance log information and/or for various components of the first computing system and/or the second computing system that may identify the root cause of an error that resulted in unattached items remaining in the dependent data of the second computing system after these items should have been removed or missing items which are present in the reference data of the first computing system but is not included in the dependent data of the second computing system. The root cause of these errors may have gone undetected in the past because a significant amount of time may have passed between the occurrence of the error and the time that the error was detected. Consequently, tracking down the cause of the error may be difficult or impossible by the time an error is detected. The techniques herein proactively search for unattached items and missing items so that the logs and/or other information that may be used to diagnose and correct the error may be preserved. A technical benefit of this approach is that it may improve the user experience by proactively detecting and facilitating the correction of the errors that lead to unattached items and/or missing items. Another technical benefit of this approach is that the computing resources, memory, and/or network resources by improving the efficiency of the applications that rely on the identifying one-way correctness of the dataset of the second computing system. These and other technical benefits of the techniques disclosed herein will be evident from the discussion of the example implementations that follow.

FIG. 1 is a diagram showing an example computing environment 100 in which the techniques herein may be implemented. The computing environment 100 includes a first computing system 125, a second computing system 105, and a synchronization and performance monitoring service 145. The first computing system 125 is a high-volume computing system that may be implemented on a server or a set of servers that provide one or more applications or services 130. The second computing system 105 is also a high-volume computing system that may be implemented on a server or a set of servers that provide one or more applications or services 110. The second computing system 105 and/or the first computing system 125 may be implemented as a cloud-based system. In some implementations, both the first computing system 125 and the second computing system 105 are implemented by an enterprise or other entity and may be implemented on the same server or set of servers. In other implementations, the first computing system 125 and the second computing system 105 are implemented by separate enterprises or other entities and are implemented on different servers or sets of servers. The first computing system 125 and the second computing system 105 may be configured to communicate via one or more public and/or private networks, which may include the combination of public and private networks commonly referred to as the Internet.

The first computing system 125 includes applications and service 130, reference dataset 135, and performance logs 140. The applications and services 130 may include various types of applications and services that may be available to users of the first computing system 125. The reference dataset 135 may be stored in persistent datastore that includes one or more types of persistent storage for storing data associated with the applications and services 130. The data may include user data, system data, and/or other data that may be provided as an input to or is obtained as an output from the applications and services 130. The performance logs 140 may be used by the applications and services 130 to keep track of events that occurred while the applications and services 130 were being executed. The performance logs 140 may include a separate log for each application or service. The performance logs 140 may include informational event information, warnings, and/or error information. The performance logs 140 may be used to diagnose and correct one-way correctness issues as discussed in the examples which follow.

The second computing system 105 includes applications and service 110, dependent dataset 115, and performance logs 120. The applications and services 110 may include various types of applications and services that may be available to users of the second computing system 105. The dependent dataset 115 may be stored in persistent datastore that includes one or more types of persistent storage for storing data associated with the applications and services 110. The data may include user data, system data, and/or other data that may be provided as an input to or is obtained as an output from the applications and services 110. The performance logs 120 may be used by the applications and services 110 to keep track of events that occurred while the applications and services 110 were being executed. The performance logs 120 may include a separate log for each application or service. The performance logs 120 may include informational event information, warnings, and/or error information. The performance logs 120 may be used to diagnose and correct one-way correctness issues as discussed in the examples which follow.

The second computing system 105 may reference data that is maintained in the reference dataset 135 by the first computing system 125. For example, data stored in the dependent dataset 115 may reference data in the reference dataset 135 of the first computing system 125. If the data in the reference dataset 135 referenced by data in the dependent dataset 115 changes without updating the data in the dependent dataset 115, one-way correctness issues, including unattached items and/or missing items, can occur. Consequently, applications or services of the second computing system 105 relying on these references being correct may experience errors that negatively impact the user experience.

The synchronization and performance monitoring service 145 includes a data synchronization unit 150 and a reporting datastore 155. The data synchronization unit 150, as discussed in detail in the examples which follow, is configured to identify one-way correctness issues including unattached items and/or missing items and to provide tools for identifying and correcting the source of the one-way correctness issues. The synchronization and performance monitoring service 145 may store information regarding the one-way correctness issues that have been identified and corrected in the reporting datastore 155, and the data synchronization unit 150 information may generate reports from the information stored in the reporting datastore 155.

In a non-limiting example to illustrate these concepts, suppose that the second computing system 105 implements a search service that provides tools for users to search for files and/or other types of content item based on search terms and/or queries formulated by the user. In some implementations, the search service is implemented by Microsoft Search®. In this non-limiting example, the first computing system 125 is a file storage and management platform that permits users to upload, download, organize, collaborate on, and/or manage files. In some implementations, the file storage and management platform may be implemented by Microsoft SharePoint®. In this example, the second computing system 105 may search for files stored and managed by the first computing system 125. To facilitate searching the files of the first computing system 125, the second computing system 105 maintains an index of files of the first computing system 125 in the dependent dataset 115. The index of files may include metadata that includes various attributes of the files of the first computing system 125 including but not limited author information, creation date and/or last modification date, file type, and subject matter. These and other file attributes may facilitate searching for files maintained by the file storage and management platform implemented by the first computing system 125.

Ideally, as the files of the file storage and management platform are added, removed, renamed, or moved, the file index maintained by the second computing system 105 is updated to reflect these changes. To facilitate updating of the file index, the second computing system 105 and the first computing system 125 may implement various services, application programing interfaces (APIs), and/or other functionality that facilitates updating the file index as changes are made to the files managed by the file storage and management platform implemented by the first computing system 125. However, the update functionality implemented by the second computing system 105 and/or the first computing system 125 are subject to error conditions that result in the file index from being updated and remaining in sync with the state of the files managed by the file storage and management platform implemented by the first computing system 125. Consequently, various one-way correctness issues may arise. The file index may refer to files that are no longer available in the file storage and management platform implemented by the first computing system 125, resulting in unattached items issues. Furthermore, the file index may not include information for files that have been added to the file storage and management platform implemented by the first computing system 125, resulting in missing item issues. Both types of issues may negatively impact the user experience for users of the search service. Users may receive search results that include files that are no longer available on the file storage and management platform or that omit files that may be relevant from the search results because those files were not included in the file index.

The data synchronization unit 150 of the synchronization and performance monitoring service 145 is configured to proactively identify one-way correctness issues, including unattached items and/or missing items, before these issues negatively impact the user experience. Referring to the preceding example, the data synchronization unit 150 may identify one-way correctness issues with respect to the file index maintained by the search service by periodically comparing the file index maintained by the search service of the second computing system 105 with file information representing a current state of the files managed by the file storage and management platform implemented by the first computing system 125. The examples which follow provide details of how the data synchronization unit 150 of the synchronization and performance monitoring service 145 may identify such one-way correctness issues and how information that may be used to identify and preserve information that may facilitate diagnosing the root cause of these issues.

While the example implementation discussed with regard in FIG. 1 describes the one-way correctness issues in terms of a search service and a file storage and management platform, the techniques provided herein may be applied to other types of high-volume computing systems that reference data in another high-volume computing system. Furthermore, while the synchronization and performance monitoring service 145 is shown as a separate service in the example shown in FIG. 1, the synchronization and performance monitoring service 145 may be implemented by the second computing system 105, the first computing system 125, or a combination thereof.

Figure 2:
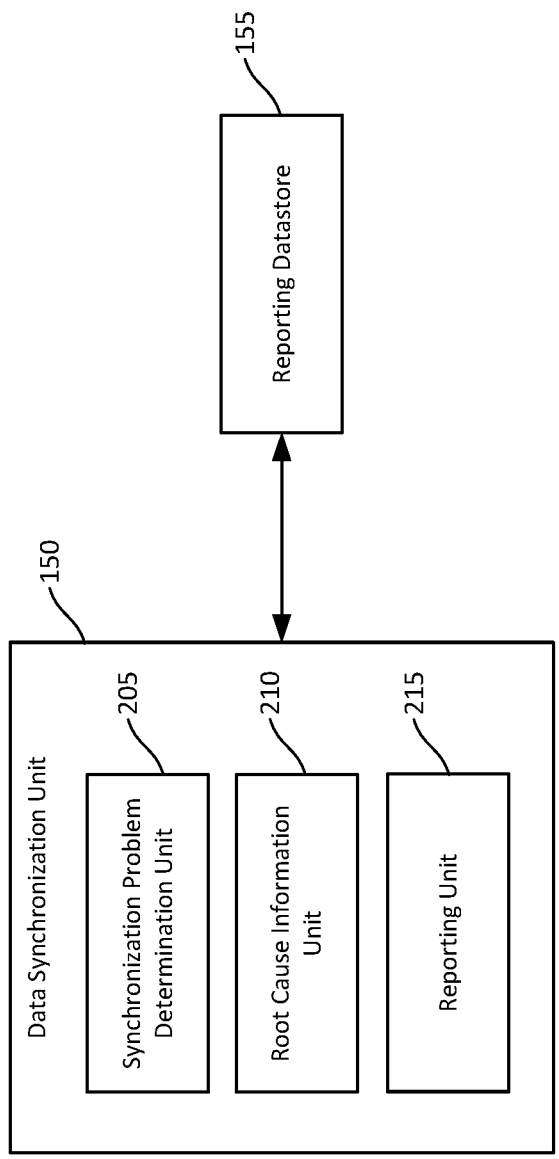
FIG. 2 is a diagram showing an example implementation of the synchronization and performance monitoring service shown in FIG. 1.

FIG. 2 is a diagram showing an example implementation of the data synchronization unit 150 of the synchronization and performance monitoring service 145 shown in FIG. 1. The data synchronization unit 150 includes a synchronization problem determination unit 205, a root cause information unit 210, a reporting unit 215, and a reporting datastore 220.

The synchronization problem determination unit 205 is configured to identify one-way correctness issues including unattached items and/or missing items in datasets that reference data on a second high-volume computing system, such as the computing system 125. Identifying and correcting such errors in separate high-volume computing systems was often difficult or impossible, because these issues often do not become visible until long after the occurrence of the error that caused the problem in the data. Often the error in the data is not discovered until a user attempts to access or utilize the referenced data. Furthermore, missing items issue often go overlooked because the user is typically unaware that references to data on the second computing system are missing.

Figure 3:
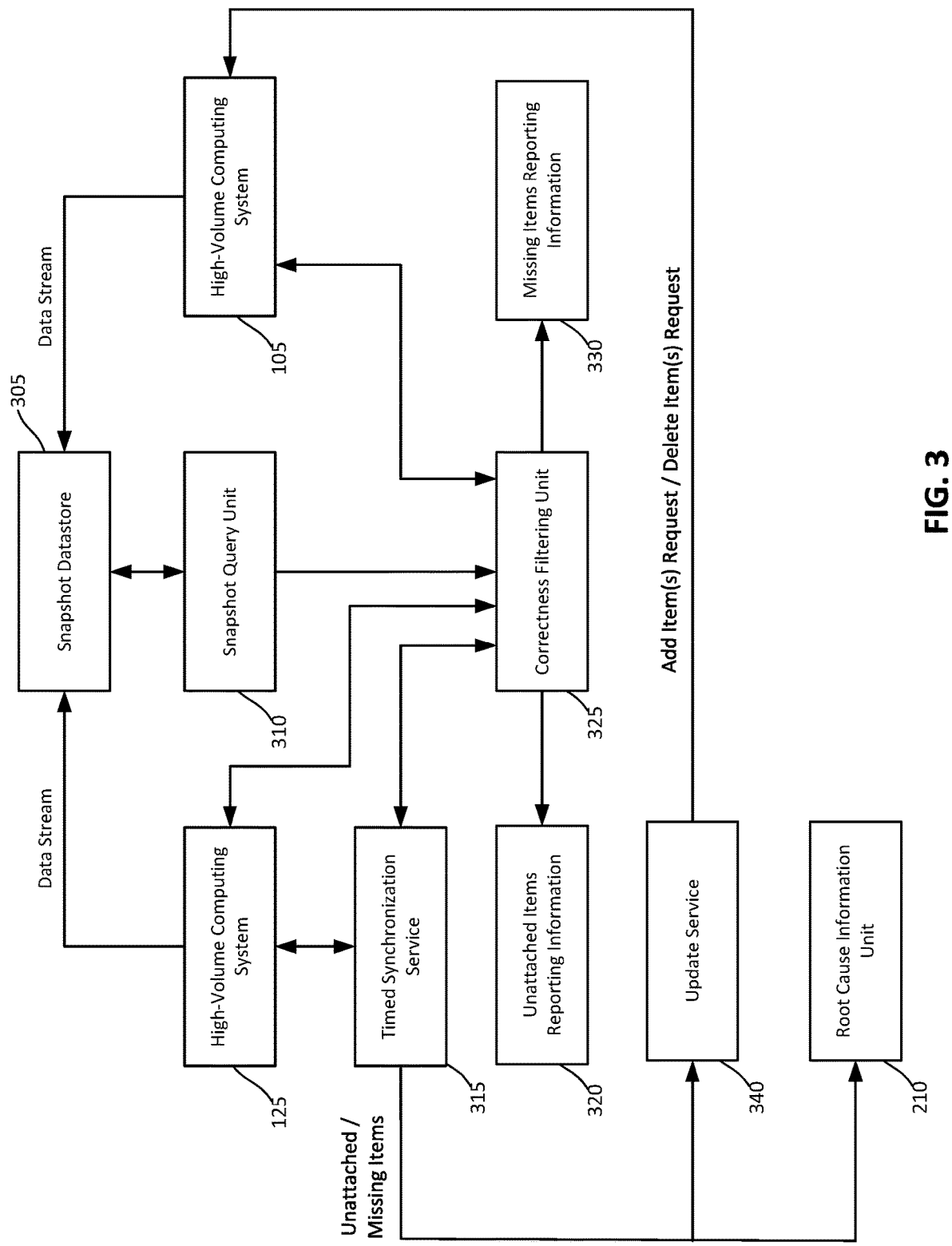
FIG. 3 is an example implementation of the synchronization problem determination unit shown in FIG. 2.
Figure 4:
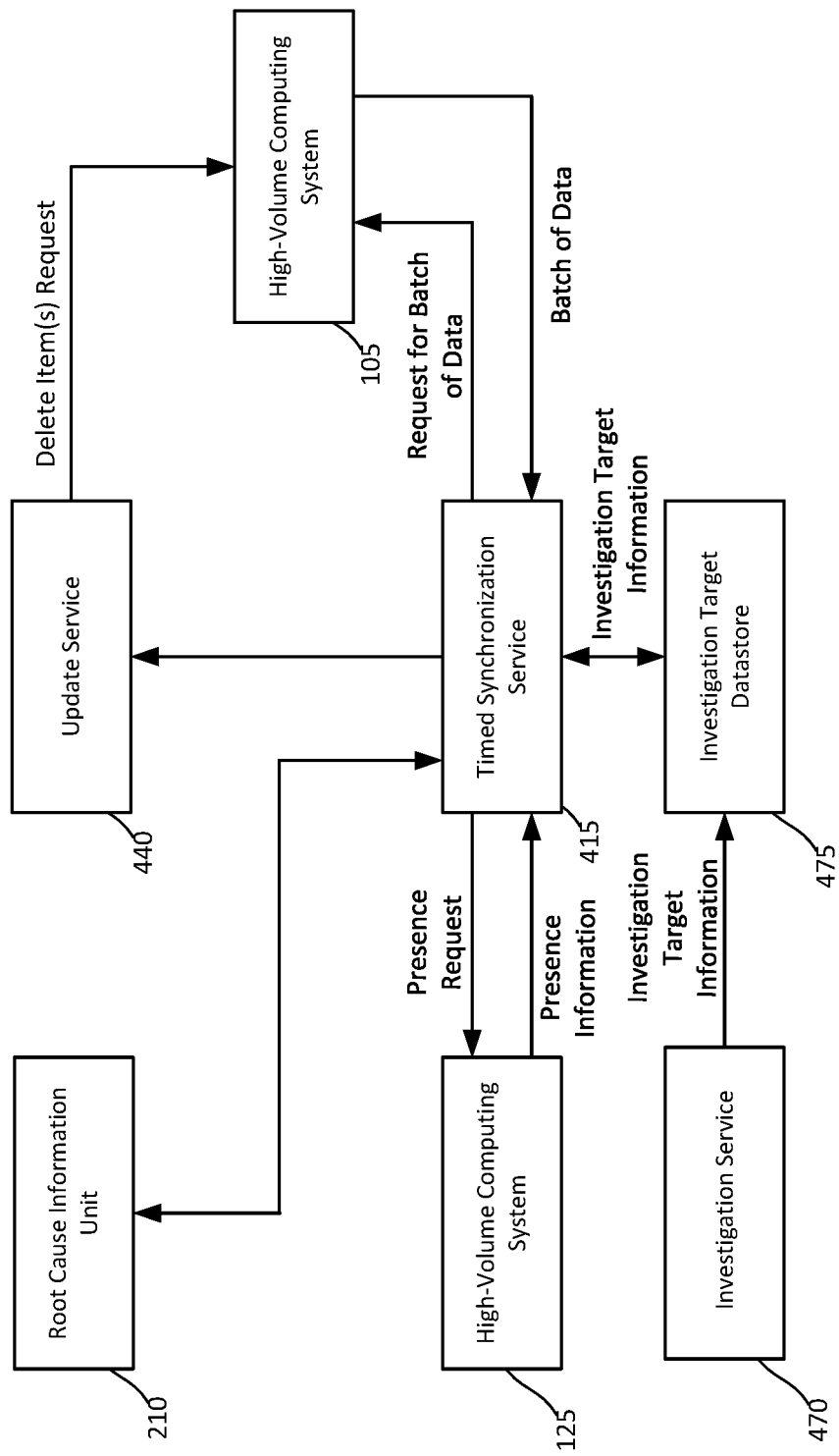
FIG. 4 is another example implementation of the synchronization problem determination unit shown in FIG. 2.

The synchronization problem determination unit 205 is configured to proactively compare data of the dependent dataset 115 of the second computing system 105 that relies on data of the reference dataset 135 of the second computing system to identify and correct unattached items and/or missing items. FIGS. 3 and 4 show a couple of example implementations of the synchronization problem determination unit 205 that may be used to identify and correct such one-way correctness issues.

The synchronization problem determination unit 205 is further configured to generate reporting information which identifies the unattached items and/or missing items detected by the synchronization problem determination unit 205 and to store the reporting information in the reporting datastore 155. This information may be used by the reporting unit 215 to generate reports that include information that may be useful for diagnosing the root cause of the errors that resulted in the one-way correctness issues in the data of the dependent dataset 115.

The root cause information unit 210 is configured to collect additional information that may be used to diagnose and correct a root cause of the errors that caused the one-way correctness issues identified by the synchronization problem determination unit 205. The root cause information unit 210 may be configured to obtain the performance logs 120 of the second computing system 105, the performance logs 140 of the first computing system 125, and/or other information generated by components of the second computing system 105 and the first computing system 125. The synchronization problem determination unit 205 may initiate the root cause information unit 210 in response to detecting an unattached item, a missing item, or other one-way correctness issue. The root cause information unit 210 may be configured to obtain the performance logs for a predetermined period of time prior to the detection of a one-way correctness issue. However, this approach will not work for missing items, and the date on which the missing item was discovered may be used as the starting point for determining the period of time for which the performance logs and/or other information are to be collected. A technical benefit of this proactive approach to detecting one-way correctness issues is that the information obtained from the performance logs and other sources may be more likely to include information that may be represent a root cause of the problem that led to the one-way correctness issue. In the past, one-way correctness issues may not be detected until an application or service attempts to utilize the data that exhibits the one-way correctness issues long after the error occurred that caused the one-way correctness issues. The synchronization problem determination unit 205 addresses this problem by proactively searching for and detecting these issues as soon as possible, making it much more likely that the relevant log data will be available for analysis.

The reporting unit 215 is configured to generate reports based on the reporting information generated by the synchronization problem determination unit 205 and the root cause information generated by the root cause information unit 210. The reports may be automatically generated by the reporting unit 215. In some implementations, the reporting unit 215 provides a user interface that enables user to generate reports on demand for the one-way correctness issues that were identified and/or root cause information collected for these issues. The reports may be useful for administrators managing the computing systems 105 and 125 and/or the engineers implementing the applications or services utilized by these computing systems to diagnose and correct the root cause of the errors that are the source of the one-way correctness issues.

The reporting datastore 220 is a persistent datastore that is configured to store reporting data generated by the synchronization problem determination unit 205 and root cause information generated by the root cause information unit 210. The reporting datastore 220 is configured to permit the reporting unit 215 to obtain the relevant reporting information and root cause information for generating reports.

FIG. 3 is an example implementation of the synchronization problem determination unit 205 shown in FIG. 2 that may be used to identify one-way correctness issues in the dataset dependent 115 of the first computing system. In the example implementation shown in FIG. 3, the example implementation of the synchronization problem determination unit 205 operates on a snapshot datastore 305 that contains a representation of the data from the both the second computing system 105 and the first computing system 125 at a particular date and/or time. The snapshot datastore 305 is used by the synchronization problem determination unit 205 instead of the accessing and querying the dependent dataset 115 of the first high volume computing system 105 and the reference dataset 135 of the first computing system 125. A technical benefit of this approach is that the synchronization problem determination unit 205 may access and query the data in the snapshot datastore 305 without consuming computing, memory, and network resources of the first computing system and the first computing system 125. The synchronization problem determination unit 205 may proactively search for one-way correctness issues without impacting the performance of the computing systems 105 and 125.

In the example implementation shown in FIG. 3, the second computing system 105 provides a first data stream to the synchronization and performance monitoring service 145 that includes the current state of data in the dependent dataset 115 and the first computing system 125 provides a second data stream to the synchronization and performance monitoring service 145 that includes the current state of data in the reference dataset 135. In some implementations, the first data stream and the second data stream may be provided in substantially real time as changes are made the data of the dependent dataset 115 and the reference dataset 135, respectively. In other implementations, the first data stream and the second data stream may be streamed to the synchronization and performance monitoring service 145, and the synchronization and performance monitoring service 145 updates the snapshot datastore 305 as these streams are received.

The example implementation of the synchronization problem determination unit 205 analyzes the data included in the snapshot datastore 305 to identify one-way correctness issues including unattached items and/or missing items. Referring back to the preceding non-limiting example implementation including a search service implemented by the second computing system 105 and a file storage and management platform implemented by the first computing system 125, the second computing system 105 streams file index information to the synchronization and performance monitoring service 145 and the first computing system 125 streams file attribute information to the synchronization and performance monitoring service 145 identifying files that are currently managed by the first computing system 125.

The timed synchronization service 315 is configured to periodically initiate a search for one-way correctness issues, including unattached items and/or missing items. The frequency at which the timed synchronization service 315 is configured to initiate the search for one-way correctness issues may vary from implementation to implementation, and this frequency may be configurable by an administrator to satisfy the needs of the particular implementation. Some implementations may require more frequent checks for one-way correctness issues while others may not require such frequent checks. In some implementations, the frequency at which the timed synchronization service 315 is configured to initiate the search for one-way correctness issues is based on the frequency at which the data relied on or referenced by the second computing system 105 and maintained in the reference dataset 135 by the first computing system 125 is updated.

The timed synchronization service 315 may initiate the snapshot query unit 310 to perform a query on the snapshot datastore 305 to identify differences between the data maintained by the second computing system 105 and the first computing system 125. In some implementations, the snapshot query unit 310 may be configured to perform a join query in which data included in the snapshot datastore 305 obtained from the second computing system 105 is compared with the data obtained from the first computing system 125 to identify items that are unattached items and/or missing items. Referring back to the preceding non-limiting example implementation in which the first computing system implements a search service and the first computing system 125 implements a file storage and management platform, the files included in the file index information obtained from the second computing system 105 is compared with the file attribute information for the files managed by the first computing system 125 to identify one-way correctness issues including unattached items and/or missing items.

The snapshot query unit 310 may output information identifying the one-way correctness issues including unattached items and/or missing items to the correctness filtering unit 325. The correctness filtering unit 325 is configured to verify that the one-way correctness issues identified by the snapshot query unit 310 are actual issues and not merely artefacts resulting from using the snapshot datastore 305 rather than querying the dependent dataset 115 and the reference dataset 135 directly. The snapshot datastore 305 is updated periodically with the data streams from the second computing system 105 and the first computing system 125. Consequently, the snapshot datastore 305 may not always reflect the current state of the dependent dataset 115 and the reference dataset 135. The correctness filtering unit 325 ensures that false positives resulting from the snapshot datastore 305 not reflecting the current state of the dependent dataset 115 and the reference dataset 135 are identified and discarded. The correctness filtering unit 325 queries the dependent dataset 115 and the reference dataset 135 to determine whether the unattached items and/or missing items identify by the snapshot query unit 310 do represent actual one-way correctness issues.

Referring back to the search service and file storage and management platform example, the correctness filtering unit 325 queries the dependent dataset 115 and the reference dataset 135 to determine whether the unattached items and/or missing items identified from the snapshot accurately reflect the state of the dependent dataset 115 and the reference dataset 135. The number of unattached items and/or missing items should be relatively small. Therefore, the query by the correctness filtering unit 325 should not unduly impact the availability and performance of the dependent dataset 115 and the reference dataset 135. If the query by the correctness filtering unit 325 indicates that there are one or more items still referenced in the file index maintained by the second computing system 105, the correctness filtering unit 325 adds the one or more unattached items to the unattached items reporting information 320. Similarly, if the query by the correctness filtering unit 325 indicates that the file index maintained by the second computing system 105 is missing information for one or more files maintained by the file storage and management platform implemented by the first computing system 125, the correctness filtering unit 325 adds the one or more missing items to the missing items reporting information 330. The unattached items reporting information 320 and the missing items reporting information 330 may be used to help identify the root cause of errors that caused the data in the two computing environments to become out of sync.

The correctness filtering unit 325 may also provide information identifying the actual unattached items and/or missing items to the timed synchronization service 315. The timed synchronization service 315 may send a request to the update service 340 that provides a list of the unattached items to be removed from the dependent dataset 115 of the computing system 110 and a list of the missing items to be added to the dependent dataset 115 of the computing system 110. The update service 340 formulates a request to the second computing system 105 to update the dependent dataset 115. In the example implementation in which the second computing system 105 implements a search service, the file index maintained by the second computing system 105 in the dependent dataset 115 is updated to remove references to unattached files from the file index that are not available on the file storage and management platform implemented by the first computing system 125. The file index is also updated to add references to missing files which are available on the file storage and management platform implemented by the first computing system 125 but were missing from the file index.

The correctness filtering unit 325 may also provide information identifying the actual unattached items and/or missing items to the root case detection unit 210. The root cause information unit 210 may use this information to determine performance log information and/or other information to be used to determine a root cause of the error that led to occurrence the one-way correctness issues.

FIG. 4 is another example implementation of the synchronization problem determination unit 205 shown in FIG. 2. The example implementation shown in FIG. 4 does not rely on a snapshot datastore to identify one-way correctness issues related to unattached items. Instead, the timed synchronization service 415 directly queries the dependent dataset 115 of the computing system 105 and the reference dataset 135 of the computing system 125. This approach avoids the need for the correctness filtering unit to detect false positives. Furthermore, the impact on the performance of the dependent dataset 115 and the reference dataset 135 is negligible, because the data is divided up into batches for processing.

The timed synchronization service 415 is similar to the timed synchronization service 315 shown in FIG. 3. The timed synchronization service 415 is configured to periodically search for unattached items in the dependent dataset 115 of the computing system 105. The frequency with which the synchronization service 415 is configured to conduct a search for unattached items may be configurable by an administrator of the synchronization and performance monitoring service 145. In some implementations, the frequency at which the timed synchronization service 415 is configured to initiate the search for one-way correctness issues is based on the frequency at which the data relied on or referenced by the second computing system 105 and maintained in the reference dataset 135 by the first computing system 125 is updated.

The timed synchronization service 415 is configured to request batches of data from the dependent dataset 115 of the computing system 105. The dependent dataset 115 may include a large amount of data that needs to be checked for one-way correctness issues but processing this data all at once is impractical and would consume too much computational, memory, and network resources. Accordingly, the timed synchronization service 415 requests the data in batches to reduce the computational, memory, and network resources of the computing system 105 and the synchronization and performance monitoring service 145. The batch size may be configured by an administrator of the timed synchronization service 415 and may be based at least in part on the size of the dataset to be checked for one-way correctness issues. The timed synchronization service 415 is configured to submit a presence request to the first computing system 125 to determine whether each item referenced in the batch of data retrieved from the dependent dataset 115 of the second computing system 105 references data that actually exists and is available in the reference dataset 135 of the first computing system 125. The timed synchronization service 415 is configured to facilitate the removal of unattached items that reference data that does not exist or is otherwise unavailable in the reference dataset 135 of the second computing system.

Referring back to the example in which the second computing system 105 implements a search service and the first computing system 125 implements a file storage and management platform, the timed synchronization service 415 retrieves batches of data from the file index maintained in the dependent dataset 115 of the second computing system 105. The timed synchronization service 415 then submits a presence request for the files included in each batch of data to the first computing system 125. The first computing system 125 queries the reference dataset 135 to determine whether each of the files referenced by the batch of file data exist, and the first computing system 125 provides presence information to the timed synchronization service 415 in response to the request. The presence information indicates whether each of the files included in the batch exist in the set of files maintained by the file storage and management platform.

The timed synchronization service 415 is configured to provide information identifying the unattached items to the update service 440. The update service 440 formulates a request to the second computing system 105 to delete the unattached items from the dependent dataset 115. In the example implementation in which the second computing system 105 implements a search service, the file index maintained by the second computing system 105 in the dependent dataset 115 is updated to remove references to unattached files from the file index.

The timed synchronization service 415 repeats this process until each of the batches of data from the dependent dataset 115 of the second computing system 105 have been processed, and the unattached items have been deleted from the dependent dataset 115. This approach provides the technical benefit of proactively identifying and correcting one-way correctness issues related to unattached items in the dependent dataset 115. The timed synchronization service 415 also provides the unattached item information to the root cause information unit 210 in some implementations. As discussed in the preceding examples, the root cause information unit 210 is configured to collect performance log information and/or collect other information that may be used to detect the root cause of the problem that resulted in the unattached items being present in the dependent dataset 115.

The example implementation shown in FIG. 4 includes an investigation service 410. The investigation service 410 is configured to monitor for certain types of events in the second computing system 105 and/or the first computing system 125 that may be indicative of or may result in one-way correctness issues. The investigation service 410 may generate investigation target information in response to the occurrence of an event, and the investigation target information may be added to the investigation target datastore 475. The investigation target datastore 475 provides a persistent storage for storing information that may be used by the timed synchronization service 415 to proactively investigate whether these events lead to one-way correctness issues. This approach enables the synchronization problem determination unit 205 to proactively search for one-way correctness issues in areas of the computing systems 105 that are mostly likely to experience one-way correctness issues. The processing of the entries in the investigation target datastore 475 by the timed synchronization service 415 are discussed in greater detail in the examples which follow.

The investigation service 410 may be configured to monitor data on a site by site or tenant by tenant basis depending upon how the second computing system 105 and/or the first computing system 125 and the various services provided therein are organized. For example, the file storage and management platform implemented by the first computing system 125 in the preceding examples may be implemented using Microsoft SharePoint®. In such an implementation, the first computing system 125 may organize the information stored there into SharePoint® sites, which function as containers for organizing, presenting, and providing tools for working with documents and/or other electronic content. The first computing system 125 may support a multitude of such sites. In other implementations, the first computing system 125 may be implemented using other platforms, which may provide similar functionality for organizing, presenting, and providing tools for working with documents and/or other electronic content. In the examples which follow, such containers for organizing, presenting, and providing tools for working with documents and/or other electronic content are collectively referred to as sites, even though other platforms may refer to such containers using different terminology.

In some implementations, the investigation service 410 is configured to monitor for deletions of data within sites that potentially may result in one-way correctness issues and to add investigation target information for those sites to the investigation target datastore 475. The investigation service 410 may monitor deletions for sites that include data that references or relies on data in other sites or for sites that include data that is referenced by or is relied upon by other sites. Such sites may be identified by an administrator of the synchronization and performance monitoring service 145. In some implementations, investigation service 410 automatically identifies sites that refer to or reference data in another site based on inter-site queries that originate in a first site and query data stored by another site. Other techniques may be used to identify the sites that have data that is interdependent.

In some implementations, the investigation service 410 is configured to monitor for file not found or content not found errors that may be indicative of one-way correctness issues in the data associated with a site and to add investigation target information for that site to the investigation target datastore 475. Referring back to the file storage and management platform example, the occurrence of a "404—File not found" error in response to a request for a file is indicative of an unattached item, a file referenced in the file index of the searching service that is unavailable on the file storage and management platform.

In some implementations, the investigation service 410 is configured to monitor for user reports of unattached items to identify one-way correctness issues in the data associated with a site and to add investigation target information for that site to the investigation target datastore 475. Referring back to the search service example, if the search service provides a search result for an unattached item, a file that is unavailable in the file storage and management platform, the user may receive an error when attempting to access that file. The search service may provide a user interface that enables the user to report such erroneous search results. In some implementations, the investigation service 410 has access to an error reporting datastore (not shown) that includes error tickets for the second computing system 105 or the first computing system 125 that are related to components which may introduce one-way correctness issues should these components experience an error.

In some implementations, the investigation service 410 is configured to monitor for sites being moved and to add investigation target information for those sites to the investigation target datastore 475. A site may be moved to a different collection of sites, to a different tenant or customer account, or to a new computing environment. Any sites that refer to data on the data maintained by the site being moved will need to be updated or delete the references to data in the site that has been moved. Similarly, a site that has been moved may depend on or refer to data in another site that was previously associated with the same collection of sites, with the same tenant or customer account, or with the same computing environment as the other site. The references in the data of the site that has moved will need to be updated or deleted.

The timed synchronization service 415 is configured to obtain investigation target information from the investigation target datastore 475 and to search for and correct one-way correctness issues associated with the sites or other components of the computing system 105 identified by the investigation service 410. The timed synchronization service 415 may be configured to search for and correct one-way correctness issues in substantially real time as the investigation target information is added the investigation target datastore 475. In other implementations, the timed synchronization service 415 may be scheduled to periodically process the investigation target information of the investigation target datastore 475. An administrator of the synchronization and performance monitoring service 145 may configured the frequency at which the investigation service 410 checks for the occurrence of events that may result in one-way correctness issues and the frequency at which the timed synchronization service 415 processes the investigation target information to identify and correct these issues. A technical benefit of this approach is that the system searches for one-way correctness issues in the events that are likely to cause such issues, thereby correcting the issues before users are impacted and collecting root cause information that can be used to diagnose and correct the source of such issues.

Figure 5:
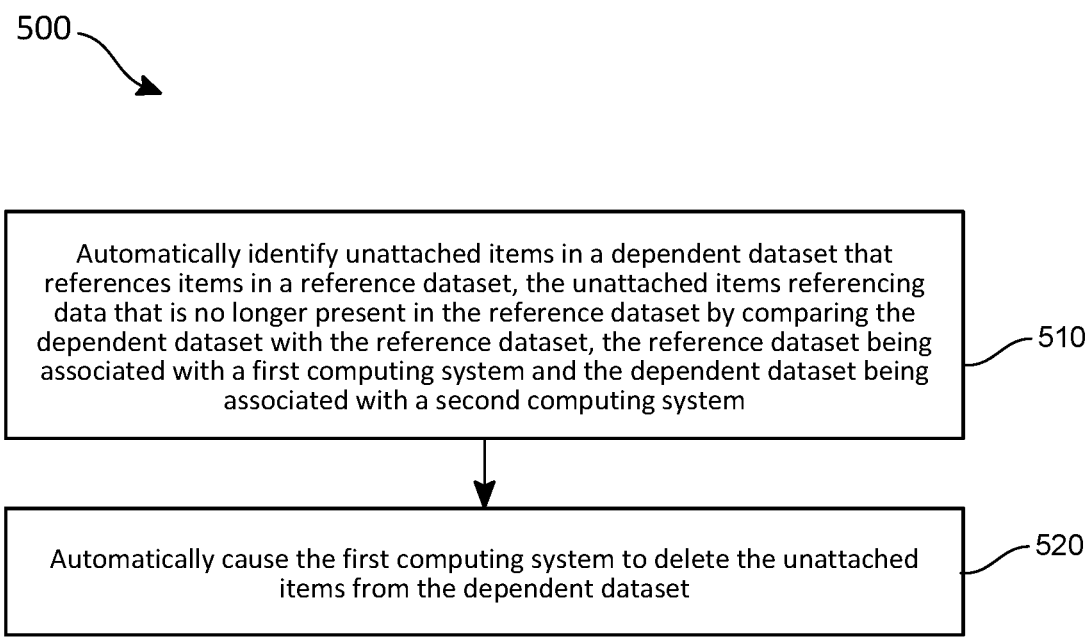
FIG. 5 is a flow diagram of a process for generating a readability score for textual content that may be implemented by the language analysis service.

FIG. 5 is an example flow chart of an example process 500 that may be implemented by the synchronization and performance monitoring service 145. The process 500 includes an operation 510 of automatically identifying unattached items in a dependent dataset that references items in a second dataset by comparing the dependent dataset 115 with the reference dataset 135. The reference dataset 135 is associated with a first computing system 125 and the dependent dataset 115 is associated with a second computing system 105. The unattached items are data in the dependent dataset 115 that reference data that is no longer present in the reference dataset 135. As discussed in the preceding examples, the synchronization and performance monitoring service 145 is configured to identify one-way correctness issues including unattached items and missing items using processes similar to those shown in FIGS. 3 and 4. The references of the dependent dataset 115 to data in the reference dataset 135 are usually kept in sync. However, an error in an application or service the first computing system 125 or the second computing system 105 or can result in at least a portion of these references no longer being in sync. For example, a delete operation may remove specific data from the reference dataset 135, but the delete operation fails to update the references to the deleted data in the dependent dataset 115.

The process 500 includes an operation 520 of automatically causing the first computing system to delete the unattached items from the dependent dataset. As shown in FIGS. 3 and 4, the dependent dataset 115 of the first computing system is automatically updated to remove the unattached items. This process may be extended to also update the dependent dataset 115 of the second computing system 105 to add missing items that are included in the reference dataset 135 of the first computing system 125 but were missing from the dependent dataset 115. A technical benefit of this approach is that these one-way correctness issues are proactively identified before these issues cause errors in the applications or services of the second computing system 105 that negatively impact the user experience. Consequently, the reliability of the second computing system 105 is significantly improved.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
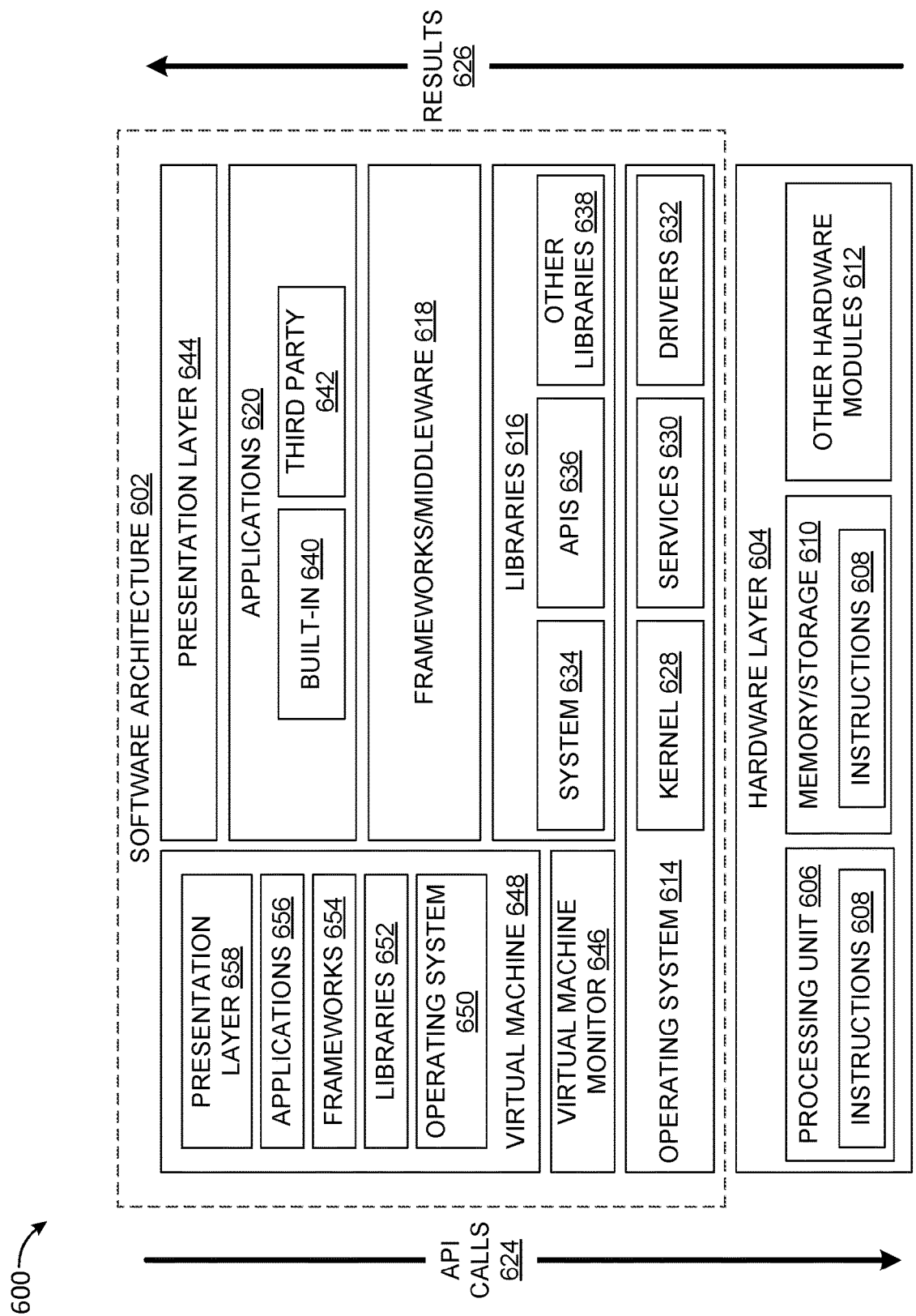
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
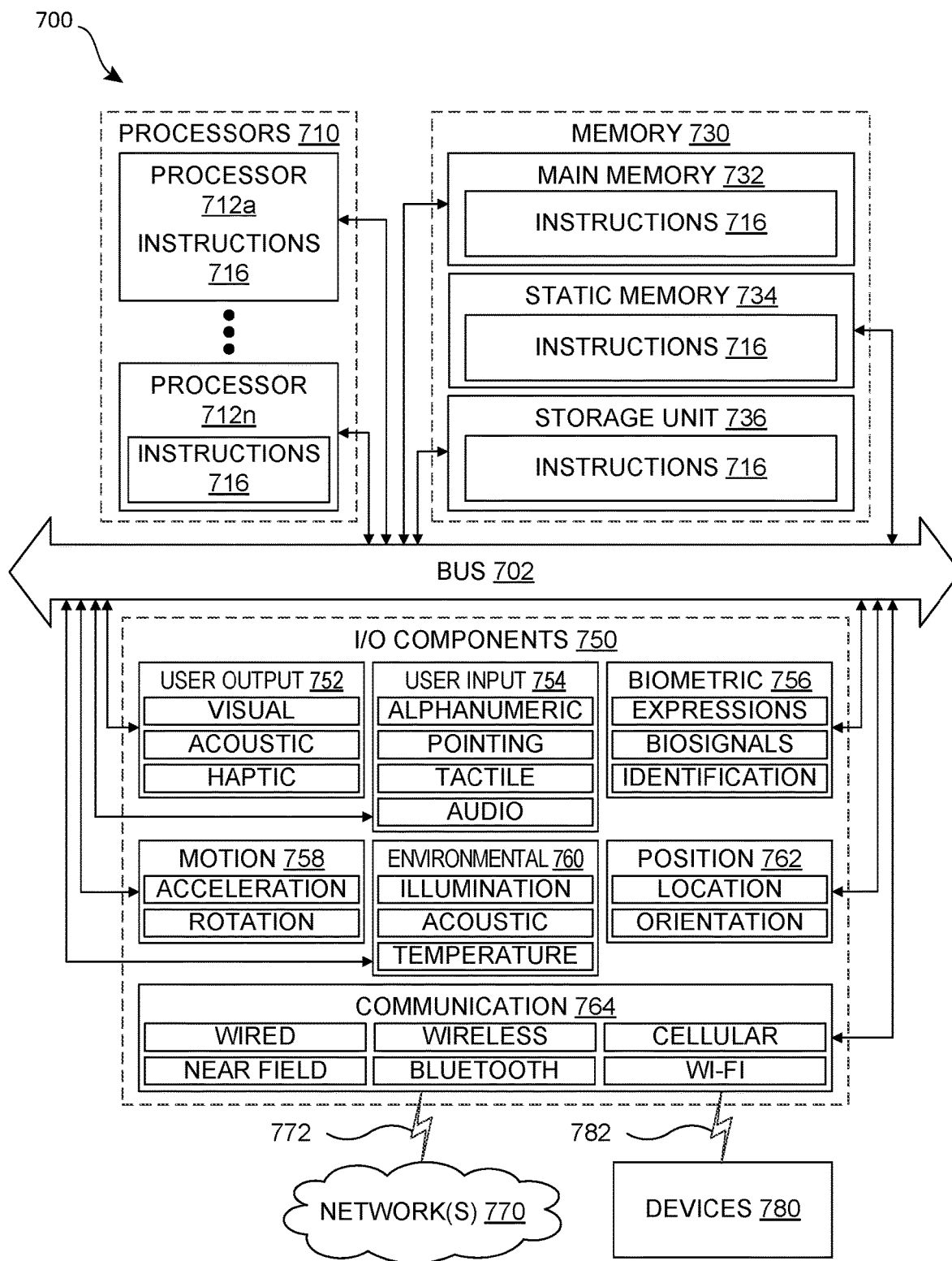
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a machine-readable medium storing executable instructions that, when executed, cause the processor to perform operations comprising:
        automatically identifying unattached items in a dependent dataset that references items in a reference dataset by comparing the dependent dataset with the reference dataset, the unattached items referencing data that is no longer present in the reference dataset, the reference dataset being implemented on a first computing system and the dependent dataset being implemented on a second computing system, the second computing system being separate from the first computing system, the unattached items in the dependent dataset resulting from a failure of synchronization functionality that updates the dependent dataset on the second computing system in response to changes to the reference dataset on the first computing system; and
        automatically causing the first computing system to delete the unattached items from the dependent dataset.

2. The data processing system of claim 1, wherein the machine-readable medium includes instructions configured to cause the processor to perform operations of:
    obtaining a first data stream from the first computing system that includes first data from the reference dataset;
    obtaining a second data stream from the second computing system that includes second data from the dependent dataset;
    populating a snapshot dataset using the first data stream and the second data stream; and
    automatically identifying the unattached items in the dependent dataset by comparing the first data in the snapshot dataset with the second data in the snapshot dataset.

3. The data processing system of claim 2, wherein the machine-readable medium includes instructions configured to cause the processor to perform operations of:
    filtering the unattached items by querying the reference dataset to verify that the unattached items are not present in the reference dataset; and
    discarding unattached items that are present in the reference dataset prior to automatically causing the first computing system to delete the unattached items from the dependent dataset.

4. The data processing system of claim 2, wherein the machine-readable medium includes instructions configured to cause the processor to perform operations of:
    automatically identifying missing items present in the reference dataset but not present in the dependent dataset when comparing the first data in the snapshot dataset with the second data in the snapshot dataset; and
    automatically causing the first computing system to add the missing items to the dependent dataset.

5. The data processing system of claim 4, wherein the machine-readable medium includes instructions configured to cause the processor to perform operations of:
    monitoring the first computing system, the second computing system, or both for an occurrence of at least one events indicative of potential one-way correctness issues being introduced into the dependent dataset; and
    triggering, in response to an occurrence of an event, identifying unattached items, missing items, or both by comparing a first portion of the dependent dataset with a first portion of the reference dataset associated with the event.

6. The data processing system of claim 1, wherein the reference dataset comprises a set of files, and wherein the dependent dataset comprises a file index that references files in the set of files.

7. The data processing system of claim 1, wherein the machine-readable medium includes instructions configured to cause the processor to perform operations of:
    identifying performance log information associated with one or more applications or services implemented by the first computing system, the second computing system, or both that may be indicative of errors that caused the unattached items in a dependent dataset; and obtaining the performance log information from the first computing system, the second computing system, or both responsive to identifying the performance log information.

8. The data processing system of claim 1, wherein comparing the dependent dataset and with the reference dataset further comprises:

obtaining the data comprising the dependent dataset from the first computing system in a plurality of first batches of data;

obtaining the data comprising the reference dataset from the second computing system in a plurality of second batches of data; and comparing each respective batch of the plurality of first batches of data with a respective batch of the plurality of second batches of data.

9. A method implemented in a data processing system for identifying one-way correctness issues in datasets of large computing systems, the method comprising:

automatically identifying unattached items in a dependent dataset that references items in a reference dataset by comparing the dependent dataset with the reference dataset, the unattached items referencing data that is no longer present in the reference dataset, the reference dataset being implemented on a first computing system and the dependent dataset being implemented on a second computing system, the second computing system being separate from the first computing system, the unattached items in the dependent dataset resulting from a failure of synchronization functionality that updates the dependent dataset on the second computing system in response to changes to the reference dataset on the first computing system; and automatically causing the first computing system to delete the unattached items from the dependent dataset.

10. The method of claim 9, further comprising:

obtaining a first data stream from the first computing system that includes first data from the reference dataset;

obtaining a second data stream from the second computing system that includes second data from the dependent dataset;

populating a snapshot dataset using the first data stream and the second data stream; and automatically identifying the unattached items in the dependent dataset by comparing the first data in the snapshot dataset with the second data in the snapshot dataset.

11. The method of claim 10, further comprising:

filtering the unattached items by querying the reference dataset to verify that the unattached items are not present in the reference dataset; and discarding unattached items that are present in the reference dataset prior to automatically causing the first computing system to delete the unattached items from the dependent dataset.

12. The method of claim 10, further comprising:

automatically identifying missing items present in the reference dataset but not present in the dependent dataset when comparing the first data in the snapshot dataset with the second data in the snapshot dataset; and automatically causing the first computing system to add the missing items to the dependent dataset.

13. The method of claim 12, further comprising:

monitoring the first computing system, the second computing system, or both for an occurrence of at least one events indicative of potential one-way correctness issues being introduced into the dependent dataset; and triggering, in response to an occurrence of an event, identifying unattached items, missing items, or both by comparing a first portion of the dependent dataset with a first portion of the reference dataset associated with the event.

14. The method of claim 9, wherein the reference dataset comprises a set of files, and wherein the dependent dataset comprises a file index that references files in the set of files.

15. The method of claim 9, further comprising:

identifying performance log information associated with one or more applications or services implemented by the first computing system, the second computing system, or both that may be indicative of errors that caused the unattached items in a dependent dataset; and obtaining the performance log information from the first computing system, the second computing system, or both responsive to identifying the performance log information.

16. The method of claim 9, wherein comparing the dependent dataset and with the reference dataset further comprises:

obtaining the data comprising the dependent dataset from the first computing system in a plurality of first batches of data;

obtaining the data comprising the reference dataset from the second computing system in a plurality of second batches of data; and comparing each respective batch of the plurality of first batches of data with a respective batch of the plurality of second batches of data.

17. A machine-readable medium on which are stored instructions that, when executed, cause a processor of a programmable device to perform operations of:

automatically identifying unattached items in a dependent dataset that references items in a reference dataset by comparing the dependent dataset with the reference dataset, the unattached items referencing data that is no longer present in the reference dataset, the reference dataset being implemented on a first computing system and the dependent dataset being implemented on a second computing system, the second computing system being separate from the first computing system, the unattached items in the dependent dataset resulting from a failure of synchronization functionality that updates the dependent dataset on the second computing system in response to changes to the reference dataset on the first computing system; and automatically causing the first computing system to delete the unattached items from the dependent dataset.

18. The machine-readable medium of claim 17, further comprising instructions configured to cause the processor to perform operations of:

obtaining a first data stream from the first computing system that includes first data from the reference dataset;

obtaining a second data stream from the second computing system that includes second data from the dependent dataset;

populating a snapshot dataset using the first data stream and the second data stream; and automatically identifying the unattached items in the dependent dataset by comparing the first data in the snapshot dataset with the second data in the snapshot dataset.

19. The machine-readable medium of claim 18, further comprising instructions configured to cause the processor to perform operations of:
   filtering the unattached items by querying the reference dataset to verify that the unattached items are not present in the reference dataset; and
   discarding unattached items that are present in the reference dataset prior to automatically causing the first computing system to delete the unattached items from the dependent dataset.

20. The machine-readable medium of claim 18, further comprising instructions configured to cause the processor to perform operations of:
   automatically identifying missing items present in the reference dataset but not present in the dependent dataset when comparing the first data in the snapshot dataset with the second data in the snapshot dataset; and
   automatically causing the first computing system to add the missing items to the dependent dataset.

* * * * *